(12) United States Patent
Lane

(10) Patent No.: US 6,179,375 B1
(45) Date of Patent: Jan. 30, 2001

(54) RAILROAD PASSENGER WALK-OVER SEAT

(76) Inventor: Jon Lane, 1885 Paula La., Des Plaines, IL (US) 60018

( * ) Notice: Under 35 U.S.C. 154(b), the term of this patent shall be extended for 0 days.

(21) Appl. No.: 09/263,991

(22) Filed: Mar. 5, 1999

(51) Int. Cl.[7] .................................................. B60N 2/42
(52) U.S. Cl. ................. 297/103; 297/216.1; 297/216.13
(58) Field of Search .............................. 297/94, 100, 101, 297/103, 216.13, 216.14, 216.1

(56) References Cited

U.S. PATENT DOCUMENTS

| | | | |
|---|---|---|---|
| 3,150,897 | * | 9/1964 | Higley ................................. 297/103 |
| 3,313,570 | * | 4/1967 | McVeigh ............................. 297/103 |
| 4,407,542 | * | 10/1983 | Kehl et al. ......................... 297/103 |
| 5,362,124 | * | 11/1994 | Schlidt .......................... 297/101 X |

FOREIGN PATENT DOCUMENTS

406135269 * 5/1994 (JP) ..................................... 297/103

* cited by examiner

Primary Examiner—Peter R. Brown
(74) Attorney, Agent, or Firm—Seyfarth Shaw

(57) ABSTRACT

A railroad passenger walk-over seat having a seat back capable of being rotated into opposed positions. A locking mechanism having engaging locking elements and a lock member to arrest movement of the seat back during forces created by abrupt deceleration. The deceleration force is dissipated by a shaft section that undergoes plastic deformation.

22 Claims, 7 Drawing Sheets

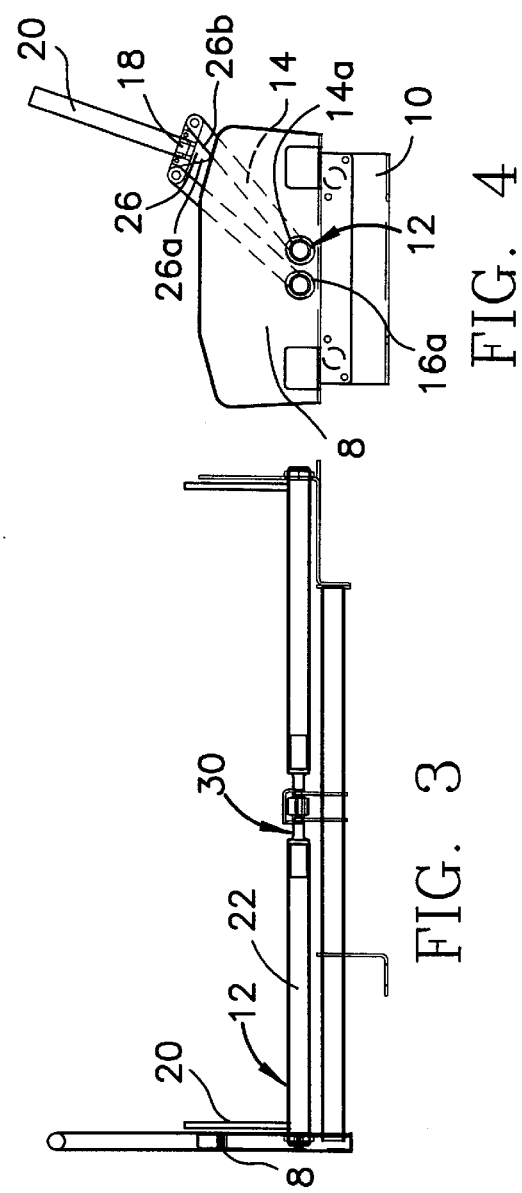
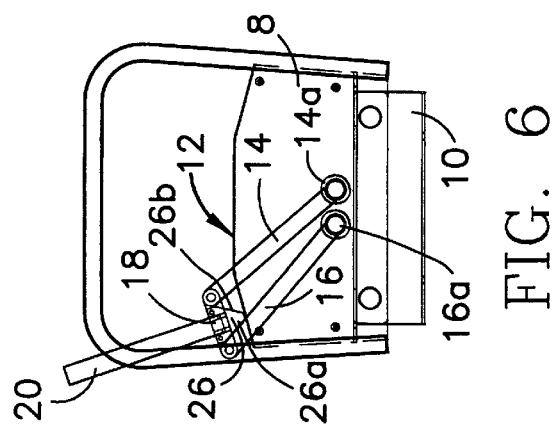

RAILROAD PASSENGER WALK-OVER SEAT

BACKGROUND OF THE INVENTION

1. Field of the Invention

This invention relates in general to railroad cars and, more particularly, to a railroad passenger walk-over seat having energy dissipation means during abrupt deceleration causing seat back impact by a passenger.

2. Summary of the Prior Art

It is common in railroad passenger cars to provide seat backs capable of being walked over or moved to face in opposite directions. There exists significant problems in the past when a passenger impacted the unrestrained seat back in front of him during rapid deceleration situations, causing catastrophic emergencies. As a result, seat backs were provided in the prior art with locking mechanisms by which the seat back was restrained when a passenger collided with the seat back in front of him. A restrained seat back, however, creates an unyielding wall-like object against which the individual would be subjected to severe deceleration during emergency situations. A one hundred and fifty pound individual, for example, could be subject to in excess of 7 g's deceleration under such situations.

In the prior art, attempts were made to install energy absorbing devices in the seat back to lessen impact by increasing the distance and/or time in which an individual is subjected to deceleration forces. One technique of energy absorption is disclosed in U.S. Pat. No. 5,149,171 to Gilevich, et al. in which a latching mechanism restrains walkover movement of the seat back in a progressive manner when impacted under deceleration forces. The technique in Gilevich, et al., however, relies on a complex and cumbersome system using a pendulum and a series of gears. The latching system of Gilevich, et al. is expensive to manufacture, difficult to service, inspect and maintain, and does not demonstrate optimum impact absorption.

Another seat locking mechanism for walk-over seats is disclosed in U.S. Pat. No. 5,362,124 to Schlidt. During rapid deceleration through impact in Schlidt, a wear surface contacts a braking surface in conjunction with an energy absorption means in the form of spring blocks and Belleville washers. Like the Gilevich, et al. system, the Schlidt locking mechanism is complex, difficult to service and is not optimally capable of alleviating serious injury to the impacting passenger. Moreover, the prior systems, such as disclosed in the foregoing Gilevich, et al. and Schlidt patents, are particularly designed for the presence of two passengers on the seat rather than a single passenger. In the case of a single passenger, the impact absorption capability of prior art walk-over seats is generally ineffective and is not sufficiently responsive to deceleration forces on a single individual. Accordingly, it is desirable in the transportation industry to provide a safer, a more economical and less complex walk-over passenger seat system.

SUMMARY OF THE INVENTION

It is, therefore, an object of the invention to provide an improved walk-over seat having a locking device and torsion means capable of dissipating significant energy during impact by one or more passengers from the rear during abrupt deceleration. The torsion means of the invention includes energy dissipation sections which undergo plastic deformation and are permanently twisted by an amount dependent on the magnitude of deceleration. The torsion means herein disclosed provides a light weight and less complex system than the prior art while being capable of superior energy dissipation under extreme conditions of abrupt deceleration. The torsion means is capable of attaining plastic deformation of up to 90° and reacts in an effective, linear function. The walk-over seat of the invention is less expensive to manufacture than prior walk-over designs, demonstrates long durability, and can easily be inspected and maintained. The locking mechanism of the walk-over seat of the invention is highly effective in restraining the seat back during rapid deceleration and operates effectively with or without the torsion means herein disclosed. In one embodiment of the invention, the torsion means and locking mechanism are used with separated side by side seats and seat backs to protect the passenger under single occupancy situations in which the prior art systems are ineffective and offer little protection. Overall, the invention provides an improved walk-over seat greatly improving the safety of the passenger as well as providing benefits of reliability and economy among many advantages.

BRIEF DESCRIPTION OF THE DRAWINGS

FIG. 3 is a front elevational view, with parts removed, of the walk-over seat assembly of FIG. 2;

FIG. 4 is an end elevational view, with parts removed, of the walk-over seat assembly of FIG. 2;

FIG. 6 is an opposite end elevational view, with parts removed, of the walk-over seat assembly of FIG. 2;

DESCRIPTION OF THE PREFERRED EMBODIMENTS

Figure 1:
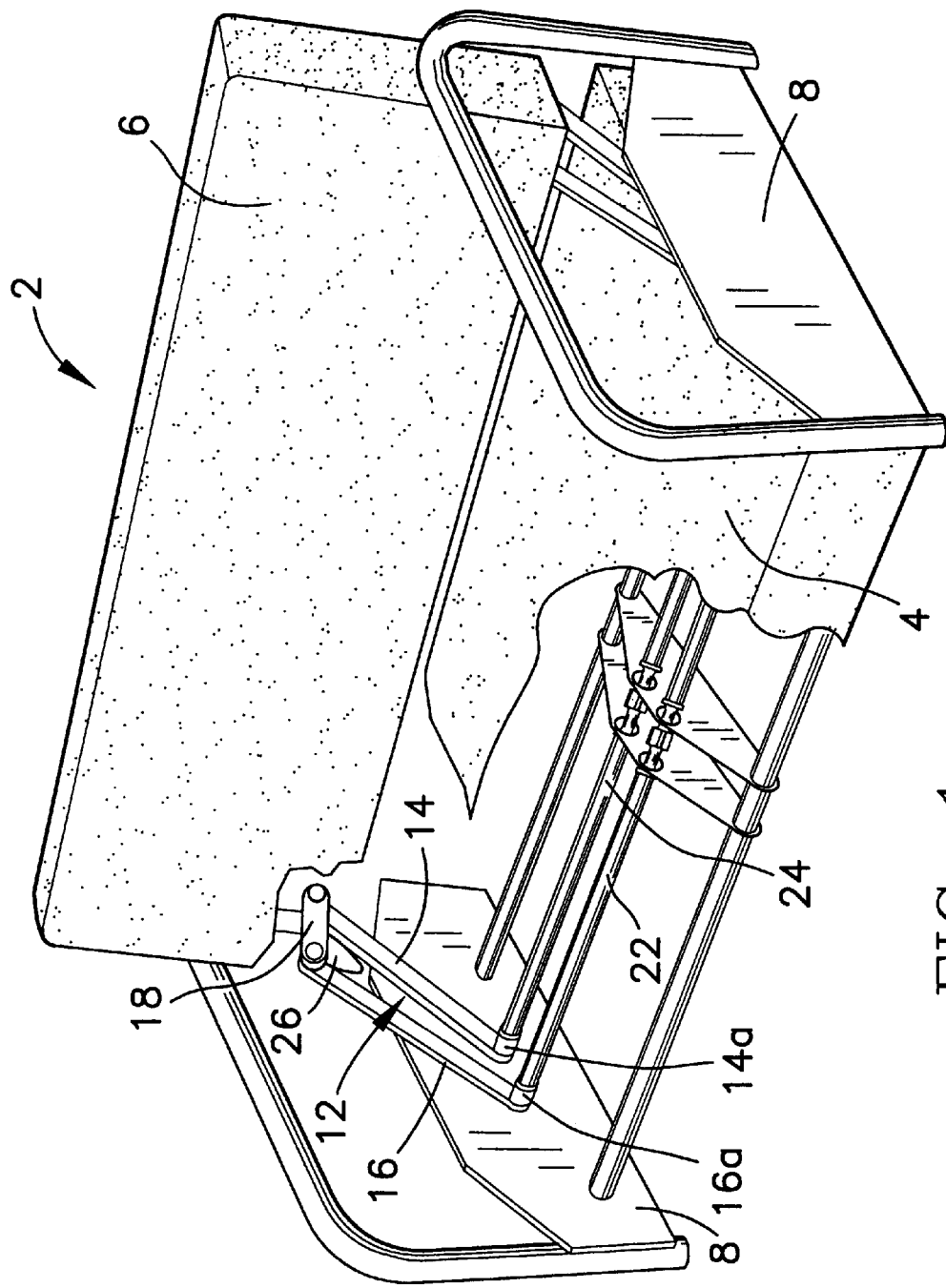
FIG. 1 is a front perspective elevational view, with parts removed, of the improved passenger walk-over seat of the invention.

Referring now to FIGS. 1 through 13, there is illustrated a first embodiment of the improved railroad passenger walk-over seat of the invention, generally designated by reference numeral 2. Although the system is described herein as a walk-over seat for passenger railroad cars, it is within the scope of invention to use the teachings of the invention in any environment in which walk-over passenger seats are employed. As is conventional, the passenger walk-over seat 2 includes a horizontal seat 4 and a walk-over seat back 6 supported on a frame 8 which rests on suitable opposed pedestals (not shown). The walk-over feature of seat 2 allows the conductor or passenger to move the seat back 6 to opposed positions relative to seat 4 whereby the passengers face in opposite directions.

The walk-over capability of passenger walk-over seat 2 is best shown in FIGS. 1 through 7. The seat walk-over mechanism 12 is provided with a pair of levers 14 and 16 suitably journaled at their lower ends 14a and 16a on the seat frame 8. The walk-over levers 14 and 16 are interconnected at their upper ends by a pivotally attached link 18. A seat back tube 20 is attached to the link 18 and seat back 6 as shown in FIGS. 4, 5, 6 and 7 to allow the walk-over movement on the levers 14 and 16 in conjunction with a pair of horizontal walk-over tubes 22 and 24. The walk-over tubes 22 and 24 are suitably journaled at both ends on frame 8 and extend through the lower ends of levers 14 and 16 and under the seat 4 from the aisle side to the window side of passenger seat 2. The opposed position of the walk-over lever mechanism 12 is shown in opposite positions of the seat back 6 in FIGS. 4 and 6. During walk-over movement from the position of FIG. 4 to the position of FIG. 6, the walk-over tubes 22 and 24 rotate in the same directions to facilitate movement of the entire seat back 6 to the opposed position.

As best seen in FIGS. 1, 4, 5, 6 and 7, the walk-over mechanism 12 is provided with an improved seat back retainer 26. The retainer 26 is affixed to the link 18 by conventional retaining means (not shown) and acts to form an abutment to retain the seat back 6 in normal positions in either of the opposed positions which are shown in FIGS. 4 and 6. The retainer 26 possesses a triangular cross-sectional configuration to form opposed abutment surfaces 26a and 26b. As seen in FIGS. 4 and 6, one or the other of the abutment surfaces 26a and 26b contacts the opposite levers 14 and 16 in the opposed seat positions of FIGS. 4 and 6 and prevents further movement to maintain the seat back 6 in its proper generally upright position.

Figure 2:
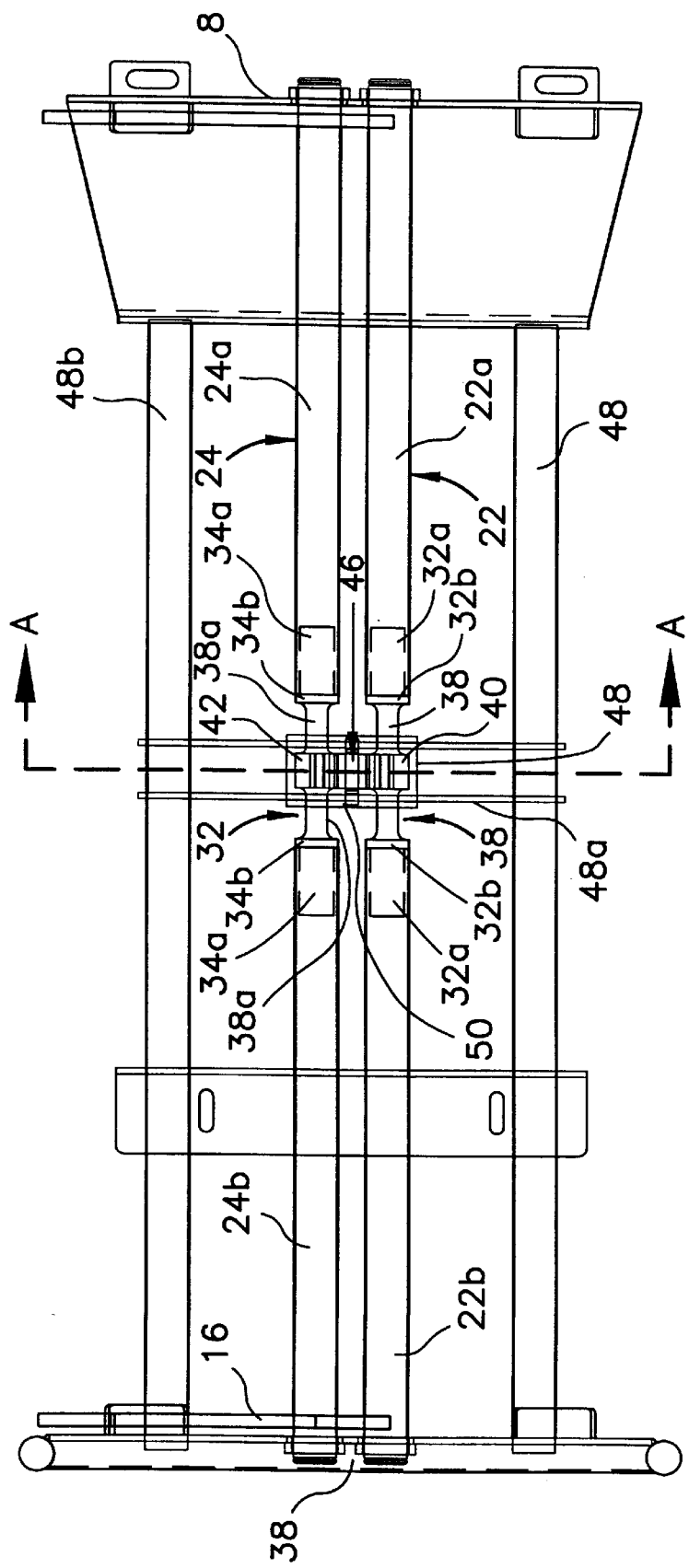
FIG. 2 is a top plan view, with parts removed, of the improved passenger walk-over seat of FIG. 1 showing the walk-over seat assembly including the locking mechanism and torsion rods of the invention.
Figure 5:
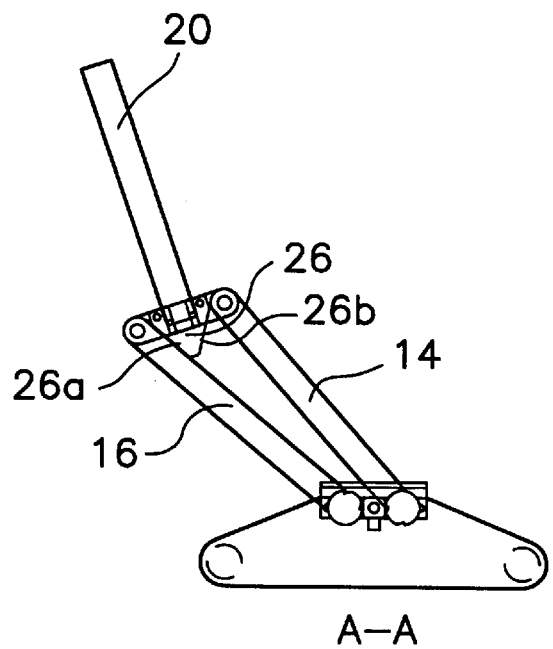
FIG. 5 is an end sectional view, with parts in section, taken along lines 5–5 of FIG. 2 and showing the seat back in an unlocked position in absence of rapid deceleration.
Figure 7:
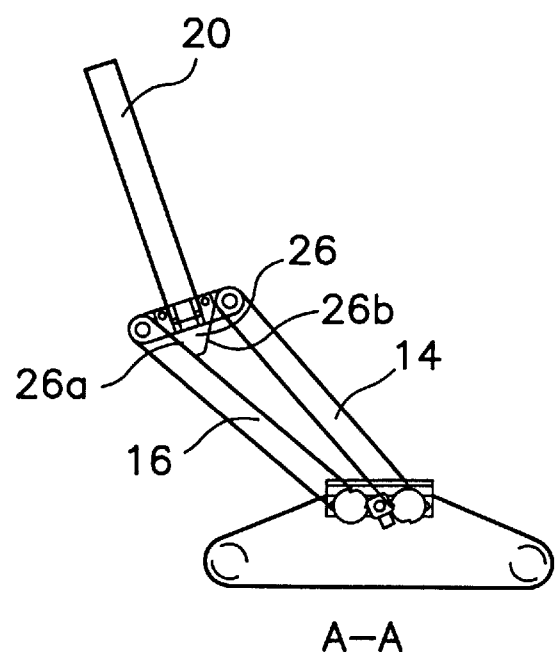
FIG. 7 is an end illustrational view taken along lines 7—7 of FIG. 2 showing the seat back in a locked position in response to deceleration impact.
Figure 11:
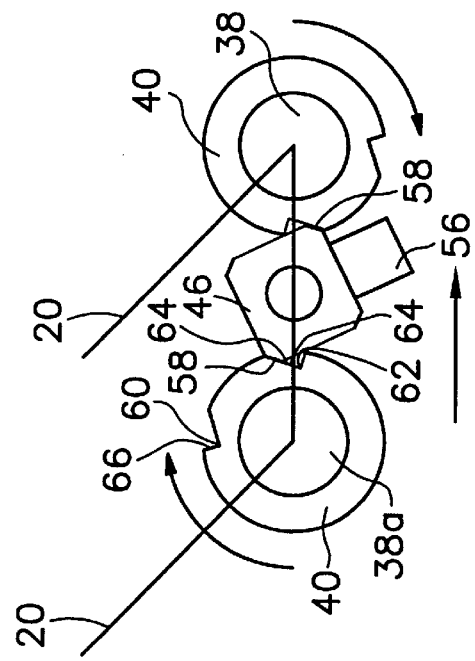
FIG. 11 is an end elevational view, with parts in section, of the locking mechanism of FIG. 8. during sudden deceleration during the direction of travel to the left view in FIG. 11.
Figure 12:
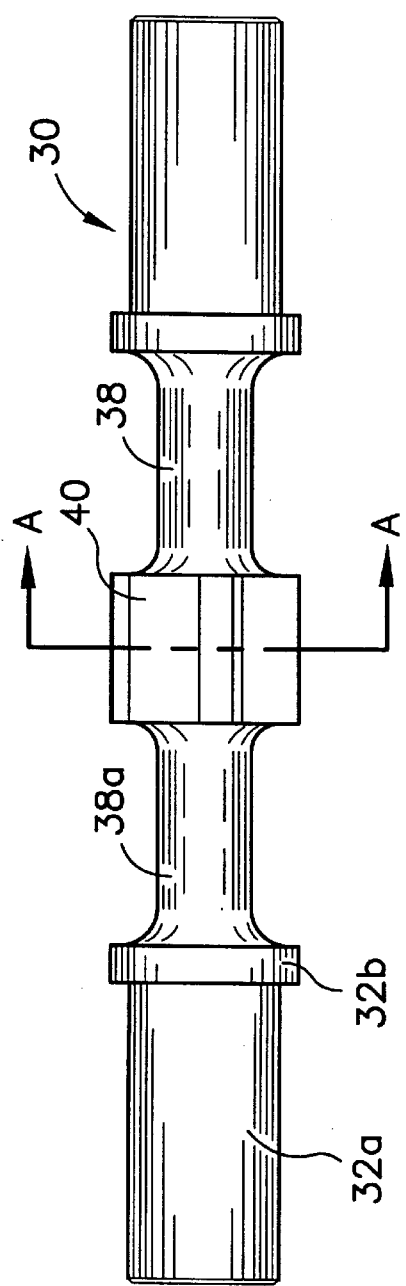
FIG. 12. is an enlarged top plan view of the torsion shaft and one of the locking mechanisms of FIG. 2.

As illustrated in FIGS. 1, 2 and 3, the walk-over tubes 22 and 24 are each separated generally at their mid-point to form two walk-over tube sections 22a, 22b and 24a, 24b. A solid energy dissipation shaft 30 is welded in secured relationship to the intermediate ends of sections 22a and 22b. Similarly, an energy dissipation shaft 32 is welded into secured relationship to the intermediate ends of walk-over tube sections 24a and 24b. Each of the energy dissipation shafts 30 and 32 are respectively provided with opposite end sections 32a and 34a which are arranged to be inserted into the ends of the walk-over tube sections 22a and 22b and walk-over sections 24a and 24b as best shown in FIGS. 2, 3 and 12. An enlarged peripheral section 32b and 34b are provided on each of the energy dissipation shafts 30 and 32 to improve securement to the walk-over tubes 22 and 24 to permit rotation of the walk-over tube sections under normal conditions of movement and twisting of the energy dissipation shafts 30 and 32 under conditions of rapid deceleration as will be described. As best seen in FIG. 12 showing energy dissipation shaft 30, both energy dissipation shafts 30 and 32 include a pair of respective sections 38 and 38a which have a diameter less than the diameter of the respective walk-over tubes 22 and 24. Each of the energy dissipation shafts 30 and 32 is provided with a raised central locking element 40, 42 to engage a lock weldment 46 which are illustrated in FIGS. 2 and 8 to 13. As shown in FIGS. 1, 2 and 3, the locking elements 40, 42 and the lock weldment 46 are encased within a box 48 which is secured by suitable braces 48a to cross tubes 48b of the seat frame 8. The lock weldment 46 is mounted on an end shaft 50 journaled on opposed walls of the box 48 for limited rotation parallel to the axis of rotation of the energy dissipation shafts 30 and 32 and cooperates with the locking elements 40, 42 for locking during abrupt deceleration. The central portion of the lock weldment 46 is generally in the shape of a square having an integral lower projection or pendulum 56. The four corners of the lock weldment 46 are cut off to form flat surfaces 58 to engage the central locking elements 40, 42 of the energy dissipation shafts 30 and 32.

Figure 8:
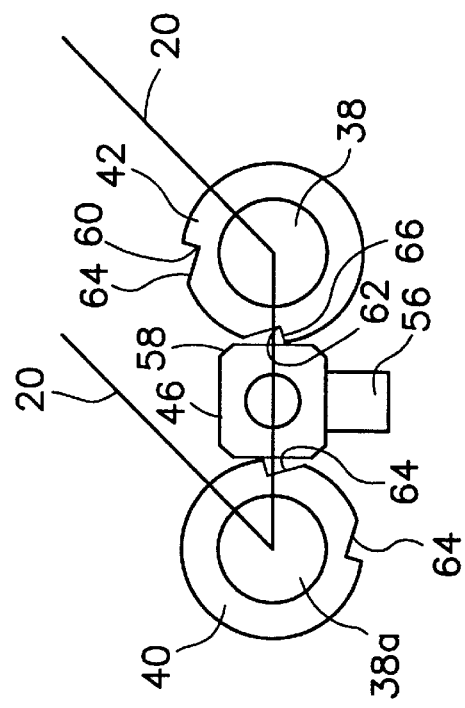
FIG. 8 is an end view with parts in section, of the locking mechanism of the walk-over seat assembly of the invention on in a normal travel position.
Figure 9:
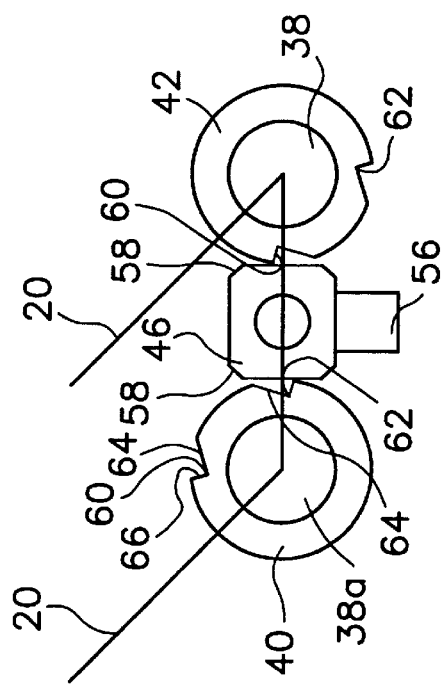
FIG. 9 is an end elevational view, with parts in section, of the locking mechanism of FIG. 8 in the opposite walk-over position under normal conditions.

As best illustrated in FIGS. 8, 9, 10 and 13, the central locking elements 40, 42 include a pair of notches or cut-out portions 60,62 created in their periphery which are situated from each other by angle of less than 180° dependent on desired operative results. The cutout portions 60, 62 each include a flat face 64 extending parallel to the axis of rotation of the energy dissipation shafts. The faces 64 intersect with a radial surface 66 which is slightly offset from the center line of the axis of rotation of the energy dissipation shafts. As seen in FIGS. 8 and 9 to illustrate normal seating conditions, the lock weldment 46 does not engage the periphery of the central locking elements 40, 42 and either face 64 or radial surface 66 of a cut-out portion 60, 62 to allow free movement of the seat back 6.

Figure 10:
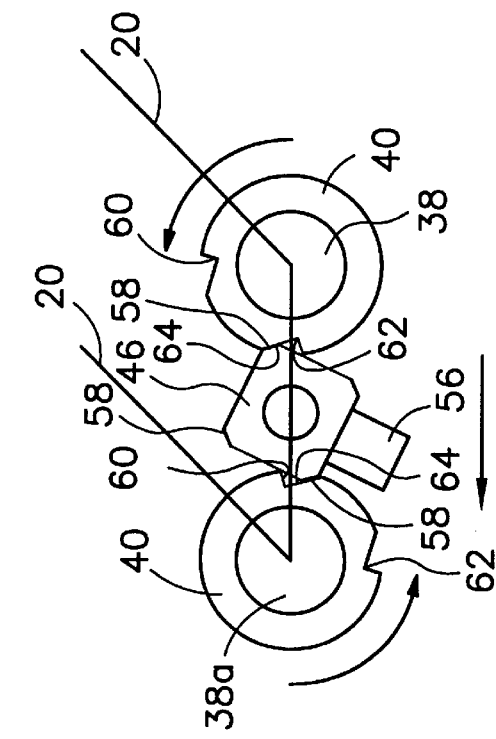
FIG. 10 is an end elevational view, with parts in section, of the locking mechanism of FIG. 8 during sudden deceleration conditions as the direction of travel is to the right viewing in FIG. 10.

In FIG. 10, the locking effect of the cooperation of the locking elements 40, 42 and the lock weldment 46 is best shown. In FIG. 10, the direction of travel and the direction the passenger faces is to the right. In the case of rapid deceleration, the walk-over tubes 22, 24 and the energy dissipation shaft 32 and 34 are rotated in opposite directions for a limited degree until the surface 58 of a corner of the lock weldment 46 engages a portion of the flat face 64. At the same time, the periphery of the locking elements 40, 42 contact a face of the lock weldment 46 with the projection 56 being rotated to the right in response to deceleration forces. After the rotation shown in FIG. 10 caused by deceleration, walk-over seat 2 is locked after only limited movement. The deceleration detected by the lower pendulum 56 to cause rotation of the lock weldment 46 is rapid in locking rotation of the energy dissipation shafts 30 and 32 and walk-over tubes 20, 24 to prevent any further movement of the seat back. In FIG. 11, the opposite movement is shown by which the direction of travel and the direction the passenger faces is to the left. The lock weldment 46 is rotated in opposite direction to the left in response to the movement of pendulum 56 to engage the cutout areas 60, 62 of the central locking elements in 40, 42 to cause prompt locking of the seat back 6. After the locking has occurred between weldment 46 and locking elements 50, 52, the energy dissipation sections 30, 32 then undergo conditions of plastic deformation by which permanent twisting of the reduced diameter sections 38, 38a occurs to the extent necessary to arrest and dissipate the force of the impact. The energy dissipation sections 38, 38a can undergo up to 90° of permanent deformation under which twisting optimum energy dissipation of the impact force of the passenger with the seat back occurs because the time in dissipating the energy is significantly increased by the plastic deformation.

Figure 13:
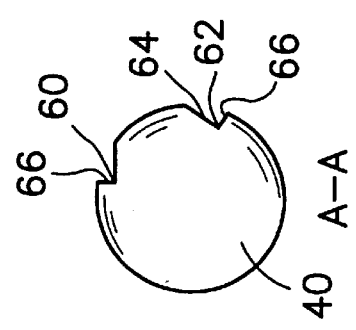
FIG. 13 is a end sectional view taken along lines 13—13 and showing one of the locking elements of the invention.
Figure 14:
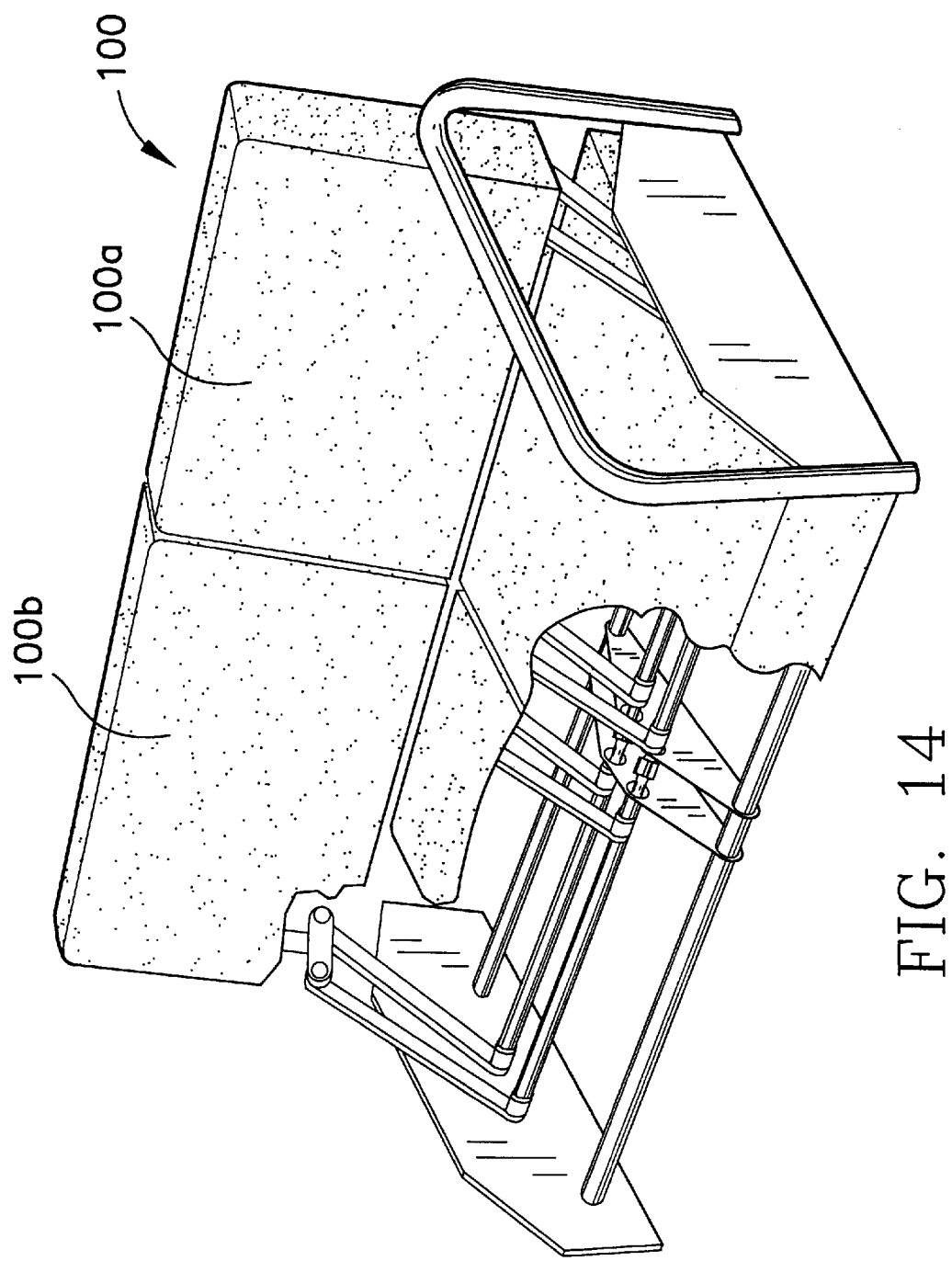
FIG. 14 is a front prospective view of the railroad passenger walk-over seat of the invention using a split seat configuration.

Referring now to FIGS. 13 and 14, there is illustrated a second embodiment of the invention generally designated by reference number 100. Seat 100 has split horizontal seats 102 and seat backs 106. Walk-over seat 100 is primarily intended to provide protection when the situation arises when the seat back 106 is impact by a single passenger because of only one passenger being present. In FIGS. 12 and 13, the seat 100 is split to provide two separate operating seats 100*a*, 100*b* for emergency situations. The split walk-over seat 100 is mounted in the same manner as the embodiment shown in FIGS. 1–13 and achieve a normal coupled movement of seats 100*a*, 100*b* from one back rest position to a second back rest position. Such coupling of the split seats 100*a* with seat 100*b* under normal conditions does not interfere with locking and energy dissipation operation under deceleration. However, when a single passenger strikes one of the seat backs 100*a*, 100*b* during deceleration, only one of seats 100*a*, 100*b* being struck will separate from the other and be subject to energy dissipation in accordance with the teachings of invention relating to permanent deformation. The structure of the walk-over mechanism, energy dissipation system and locking means used with split seat 100 is identical to the single walk-over seat 2 of FIGS. 1–13 to which reference is made for details.

What is claimed is:

1. A walk-over passenger seat comprising
   seat means having a seat back being mounted for movement between oppositely facing position;
   lever means being affixed to said seat back, shaft means being mounted on said seat means and affixed to said lever means for rotation relative to said seat means to permit said seat back to be moved to said oppositely facing positions,
   locking means affixed to said shaft means arresting rotation of said shaft means and locking said seat back in response to deceleration forces, and
   energy dissipation means being coupled to said shaft means, said energy dissipation means having at least one shaft section for undergoing twisting for dissipation of energy upon locking of said seat back.

2. The walk-over passenger seat according to claim 1 wherein said at least one shaft section undergoes permanent plastic deformation upon locking of said seat back section.

3. The walk-over passenger seat according to claim 1, wherein said shaft means includes a pair of walk-over shafts, each of said walk-over shafts having two end sections, each of said end sections being separated by said energy dissipation shaft section.

4. The walk-over passenger seat according to claim 3 wherein said locking means includes a locking element mounted on each of said energy dissipation shaft sections, each of said locking elements having abutment surfaces.

5. The walk-over passenger seat according to claim 4 wherein locking means includes a locking member operatively disposed adjacent to each of said locking elements for engaging at least one of said abutment surfaces during deceleration.

6. The walk-over passenger seat according to claim 5 wherein said locking member is mounted for rotational movement relative to said locking elements.

7. The walk-over passenger seat according to claim 6 wherein said locking member includes projection means responsive to deceleration for rotating said locking member into locking contact with each of said locking elements.

8. The walk-over passenger seat according to claim 1 wherein said seat back includes two separated sections lying side by side on said seat means, said separate sections of seat back being independently responsive to deceleration forces for arresting rotation of said shaft means.

9. A walk-over passenger seat having a seat back freely moveable between opposed positions under normal conditions comprising
   seat means having a seat back, said seat back being mounted on said seat means for movement between oppositely facing positions.
   locking means operatively connected to the seat back for preventing movement of said seat back in response to deceleration forces, and
   shaft means mounted on said seat means and affixed to said seat back, said locking means being mounted on said seat means for contacting said shaft means for preventing movement of said seat back in response to deceleration forces, said shaft means having means for dissipating energy force of the deceleration force while movement of said seat back is prevented.

10. The walk-over passenger seat according to claim 9 wherein said shaft means includes an energy dissipation section and said section being capable of being twisted upon deceleration forces.

11. The walk-over seat according to claim 9 wherein said energy dissipation shaft undergoes permanent plastic deformation.

12. The walk-over seat according to claim 9 wherein said locking means includes a rotatably mounted member mounted on said seat means, said rotatably mounted member having at least one locking surface, at least one locking element operatively coupled to the shaft means for contacting said at least one locking surface during deceleration for locking the seat back.

13. The walk-over seat according to claim 8 wherein said locking means is rotatably mounted on said seat means, said locking means having a portion for rotating said locking means in response to deceleration forces for causing said locking means to contact said portion of said shaft means.

14. An energy dissipation device for a walk-over seat back comprising seat means having a walk-over seat back, a shaft having a pair of ends attached to said seat means and affixed to the walk-over seat back, said shaft having an intermediate energy dissipating section, and said section having a smaller diameter than said shaft.

15. The energy dissipation device according to claim 14 wherein said section is mounted intermediate of said pair of ends.

16. The energy dissipation device according to claim 14 wherein said intermediate energy dissipation section is capable of undergoing permanent deformation.

17. A walk-over passenger seat comprising seat means having a seat back being mounted for movement between opposite facing directions, lever means being mounted on said seat means in coupled relationship to said seat back for permitting said movement, said lever means including a pair of spaced levers pivotally mounted on said seat means and retainer means affixed to said lever means for contacting a respective one of said pair of levers in one of said oppositely facing directions of said seat back for locking said seat back against movement said retainer means contacting the other of said pair of levers in the other of said oppositely facing directions.

18. The walk-over passenger seat according to claim 17 wherein said spaced levers respectively having opposed surfaces for forming opposed abutment surfaces, said retainer means being mounted between said pair of levers and contacting one of said abutment surfaces in said respective opposite facing directions of said seat back.

19. The walk-over passenger seat according to claim 17 wherein said retainer means is formed by a triangular member.

20. A walk-over passenger seat comprising
a seat frame having a pair of opposite ends,
a seat back,
at least one shaft extending generally between said opposite ends of said seat frame,
said at least one shaft mounting said seat back to said seat frame for movement in oppositely facing positions of said seat back,
energy dissipation means being mounted on said at least one shaft for arresting said movement in response to deceleration forces, and
said energy dissipation means being mounted inward in spaced relationship to said pair of opposite ends.

21. The walk-over passenger seat device according to claim 20 wherein said energy dissipation means is mounted generally at a midpoint of the shaft between said pair of opposite ends.

22. The walk-over passenger seat device according to claim 20 wherein said energy dissipation means includes a shaft section capable of under going torsional deformation upon the seat back being subjected to deceleration forces.

* * * * *